(12) United States Patent
Kraemer et al.

(10) Patent No.: US 7,470,902 B1
(45) Date of Patent: Dec. 30, 2008

(54) INFRARED CAMERA ELECTRONIC ARCHITECTURES

(75) Inventors: Douglas R. Kraemer, Goleta, CA (US); William J. Parrish, Santa Barbara, CA (US); Leonard S. Araki, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 11/384,588

(22) Filed: Mar. 20, 2006
(Under 37 CFR 1.47)

(51) Int. Cl.
*G02F 1/01* (2006.01)
(52) U.S. Cl. ...................... 250/330; 250/340
(58) Field of Classification Search ................ 250/330
See application file for complete search history.

(56) References Cited

U.S. PATENT DOCUMENTS

| | | | |
|---|---|---|---|
| 5,563,962 A * | 10/1996 | Peters et al. ............... 382/261 |
| 6,288,395 B1 * | 9/2001 | Kuhnly et al. ........... 250/339.04 |
| 6,353,223 B1 * | 3/2002 | Ookawa ..................... 250/330 |
| 6,690,011 B2 * | 2/2004 | Watanabe et al. ........... 250/330 |
| 6,849,849 B1 * | 2/2005 | Warner et al. ............... 250/330 |
| 7,139,411 B2 * | 11/2006 | Fujimura et al. ............ 382/103 |

* cited by examiner

*Primary Examiner*—David P. Porta
*Assistant Examiner*—Jessica L Eley
(74) *Attorney, Agent, or Firm*—MacPherson Kwok Chen & Heid LLP; Greg J. Michelson

(57) ABSTRACT

In accordance with one or more embodiments of the present invention, an infrared camera includes an infrared detector providing infrared data and a programmable logic device providing timing and control signals to the infrared detector and processing the infrared data to provide an output signal based on the infrared data. Additional memory devices, if present, may be controlled by the programmable logic device, which manages the flow of information for the memory devices.

18 Claims, 3 Drawing Sheets

INFRARED CAMERA ELECTRONIC ARCHITECTURES

TECHNICAL FIELD

The present invention relates generally to electrical circuits and, more particularly, to electronic architectures for infrared cameras.

BACKGROUND

Infrared cameras are well known and are increasingly used in a wide variety of applications. However, a typical infrared camera has certain drawbacks and may be limited in its use for certain applications due to its cost, size, and/or power requirements. In general, these limitations may be attributed to the infrared camera's complex architecture and custom, discrete, and specialized circuitry.

For example, a conventional infrared camera architecture may include one or more specialized processors, such as a digital signal processor and a custom microprocessor, with associated embedded memory along with numerous discrete memory devices, controllers, and other specialized circuitry (e.g., application specific integrated circuits). Typically, glue logic and other types of circuitry are employed to form the necessary interfaces within the architecture and with the focal plane array (FPA) of the infrared camera.

Consequently, this conventional infrared camera architecture is generally costly, cannot be easily upgraded, requires significant circuit board area, and has significant power requirements. As a result, there is a need for improved architectures for infrared camera electronics.

SUMMARY

Systems and methods are disclosed herein to provide improved infrared camera architectures. For example, in accordance with an embodiment of the present invention, an infrared camera is disclosed that employs a programmable logic device (PLD), such as a field programmable gate array (FPGA), along with one or more external memories to perform the necessary control and processing for the infrared camera operation. The PLD may be configured to provide a memory controller to control the data flow within the infrared camera. The PLD may also be configured to provide timing, control, calibration, and biasing for the infrared detector and perform processing for compensation and correction of the data provided by the infrared detector. Consequently, the infrared camera may provide significant benefits over conventional infrared camera architectures in terms of size, cost, complexity, upgrade capability, and/or power requirements.

More specifically in accordance with one embodiment of the present invention, an infrared camera includes an infrared detector adapted to provide infrared data; a programmable logic device, coupled to the infrared detector, adapted to provide timing and control signals to the infrared detector and process the infrared data to provide an output signal based on the infrared data; and a first non-volatile memory adapted to store configuration data for the programmable logic device, wherein the programmable logic device is further adapted to provide a memory controller function comprising a cache-based distributed controller function for the infrared camera.

In accordance with another embodiment of the present invention, an infrared camera includes means responsive to infrared energy for providing infrared data; a programmable logic device adapted to control the providing means and process the infrared data to provide an output signal based on the infrared data, wherein the programmable logic device is further adapted to provide an embedded processor for processing the infrared data; a first means for storing configuration data for the programmable logic device and calibration data for the providing means; and a second means for storing the infrared data.

In accordance with another embodiment of the present invention, a method of providing infrared images includes converting received infrared energy to infrared data; controlling the converting operation by a programmable logic device; processing the infrared data by the programmable logic device; storing in a non-volatile memory configuration data and processor routines for the programmable logic device and calibration data for the converting operation; and providing volatile memory for temporary storage and video buffering, wherein the programmable logic device provides memory controller functionality to manage the transfer of information between the volatile memory, the non-volatile memory, and the programmable logic device.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
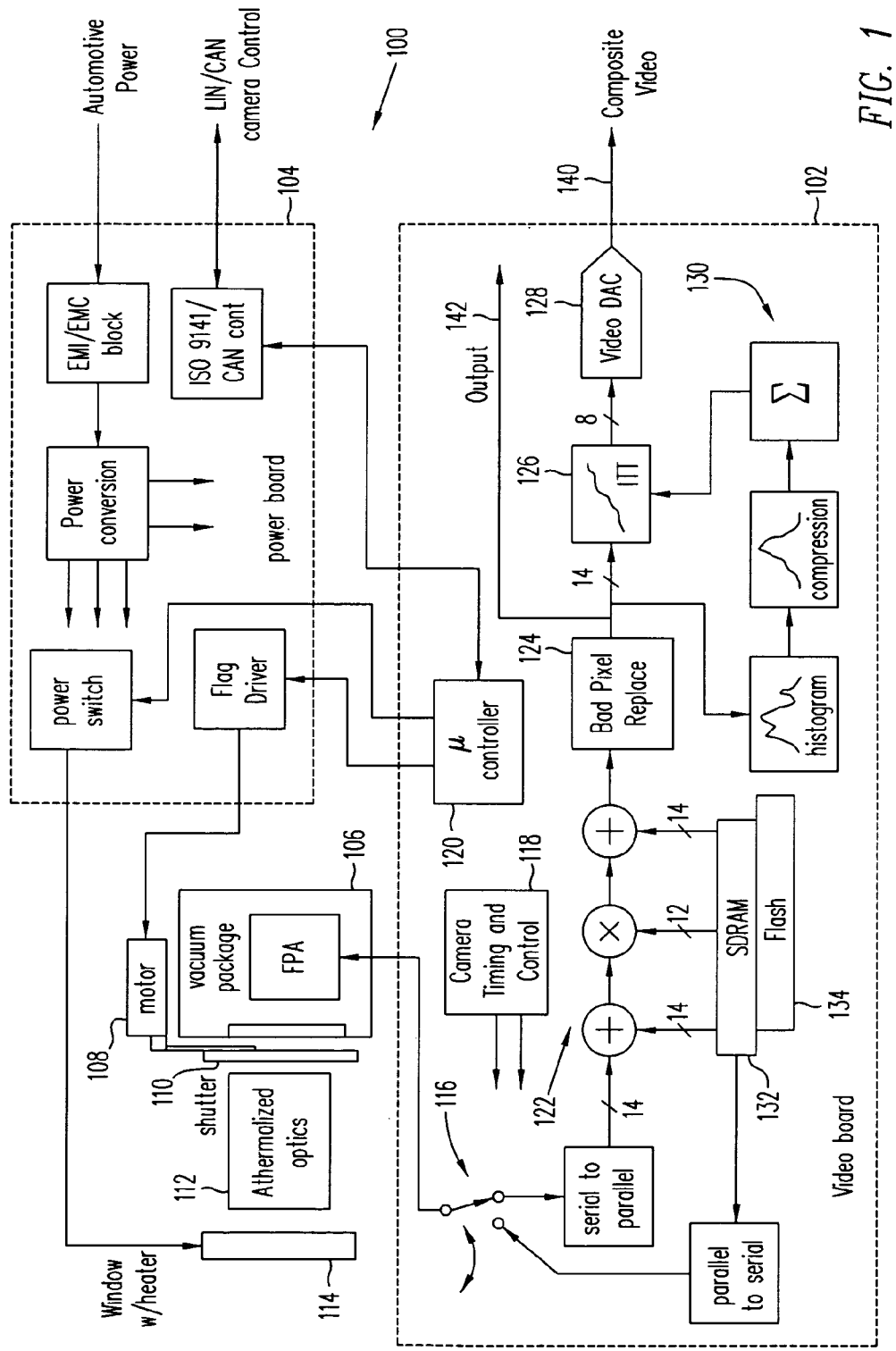
FIG. 1 shows a system functional block diagram for an infrared camera architecture in accordance with an embodiment of the present invention.

FIG. 1 shows a system functional block diagram for an infrared camera architecture 100 in accordance with an embodiment of the present invention. Infrared camera architecture 100 may be employed for any desired type of infrared camera application and is not limited to any specific exemplary embodiment disclosed herein. For example, in accordance with an embodiment of the present invention, infrared camera architecture 100 may be implemented within an infrared camera system of a motorized vehicle (e.g., an automobile), but this is not limiting as infrared camera architecture 100 may be implemented within a wide variety of infrared camera systems (besides automotive applications) as would be understood by one skilled in the art.

Infrared camera architecture 100 includes a video block 102, a power block 104, a detector package 106, a motor 108, a shutter 110, an optics block 112, and a window 114. Power block 104 may comprise a circuit board power subsystem (e.g., a power board) for infrared camera architecture 100. For example, power block 104 may provide various power conversion functions and desired power supply voltages, power on-off switching (e.g., for heater for window 114), and various other functions (e.g., a flag driver for motor 108), including an interface to a battery or external power supply, as would be understood by one skilled in the art. For this exemplary application, power block 104 may interface with a vehicle's power supply system (e.g., an automotive power supply) and control system (e.g., LIN/CAN network interfaces for vehicles or RS-232 SCI).

Motor 108 controls shutter 110 for detector package 106 (e.g., a vacuum package) that includes a focal plane array (FPA) or other type of infrared detector. Infrared energy passes through window 114 (with optional heater) and optics block 112 (e.g., athermalized optics) to associated detector package 106 in a conventional fashion.

Video block 102 (e.g., a video board or video circuit board) interfaces with power block 104 and detector package 106, with video block 102 providing video data out 140 (e.g., composite video for NTSC display, such as for a display within the vehicle for viewing by the driver or passenger of the vehicle) based on data provided by detector package 106 (e.g., from a read out integrated circuit (ROIC) of the FPA). Video block 102 includes a conversion circuit 116 to switch between and/or convert serial data from detector package 106 to parallel data for processing or to convert parallel data to serial data to provide to detector package 106. The data may be routed by one or more switches, as illustrated in an exemplary fashion in FIG. 1.

Video block 102 provides camera control and processor functionality, such as for example a timing and control block 118 and a processor block 120 (e.g., a microcontroller or other type of processor executing an instruction set). Timing and control block 118 provides various camera and timing control functions (e.g., controls switching of conversion circuit 116 and provides data, frame-sync, and reset to the FPA), while processor block 120 interfaces with and provides control functionality for power block 104. For example, processor block 120 controls motor 108 via the flag driver of power block 104, the heater of window 114 via the power switch of power block 104, and interfaces with and supports the external interface (e.g., LIN/CAN network interface). Processor block 120 may further perform other processing functionality for video block 102, as discussed further herein.

Video block 102 includes one or more memory devices (e.g., an SDRAM 132 and a flash memory 134) for storing for example configuration data, calibration data, and/or correction data as explained further herein for infrared camera architecture 100. For example, video block 102 performs non-uniformity correction (NUC) on the data from detector package 106 at a correction function block 122 based on parameters stored in SDRAM 132 and/or flash memory 134. As an example, correction function block 122 performs NUC on each pixel of data provided by detector package 106 by adding a temperature dependent offset, multiplication by a gain term, and adding a fine offset and/or flat field compensation offset (e.g., as illustrated by "+" and "x" and "+" symbols, respectively), as would be understood by one skilled in the art.

Video block 102 also may provide additional processing, by using a bad pixel replacement block 124, an intensity transform table (ITT) block 126 and an associated histogram and compression function block 130 (e.g., with memory), and a video digital-to-analog converter (DAC) block 128. For example, bad pixel replacement block 124 replaces bad pixel data identified during calibration or run-time with synthesized pixel data from neighboring pixels. ITT block 126 provides 14-bit to 8-bit data transformations, with the ITT tables based on the associated histogram/compression information (e.g., histogram-based automatic gain control). Video block 102 provides video data out 140 (e.g., composite video, such as 8-bit AGC video data) from video DAC block 128 and may also provide a digital output 142 (e.g., 14-bit corrected data) of the video data from detector package 106.

Figure 2:
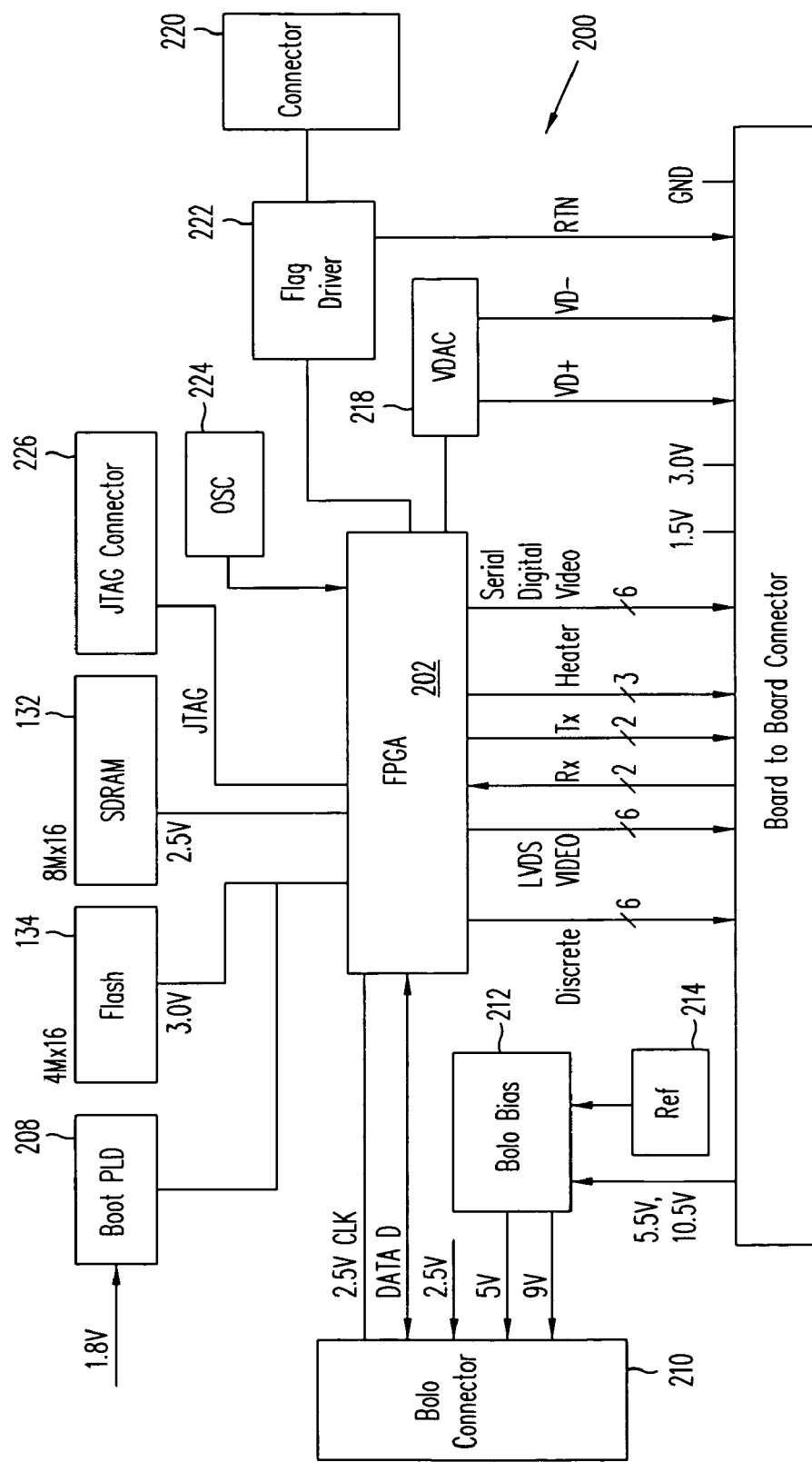
FIG. 2 shows an exemplary circuit block diagram for a portion of the infrared camera architecture of FIG. 1 in accordance with an embodiment of the present invention.
Figure 3:
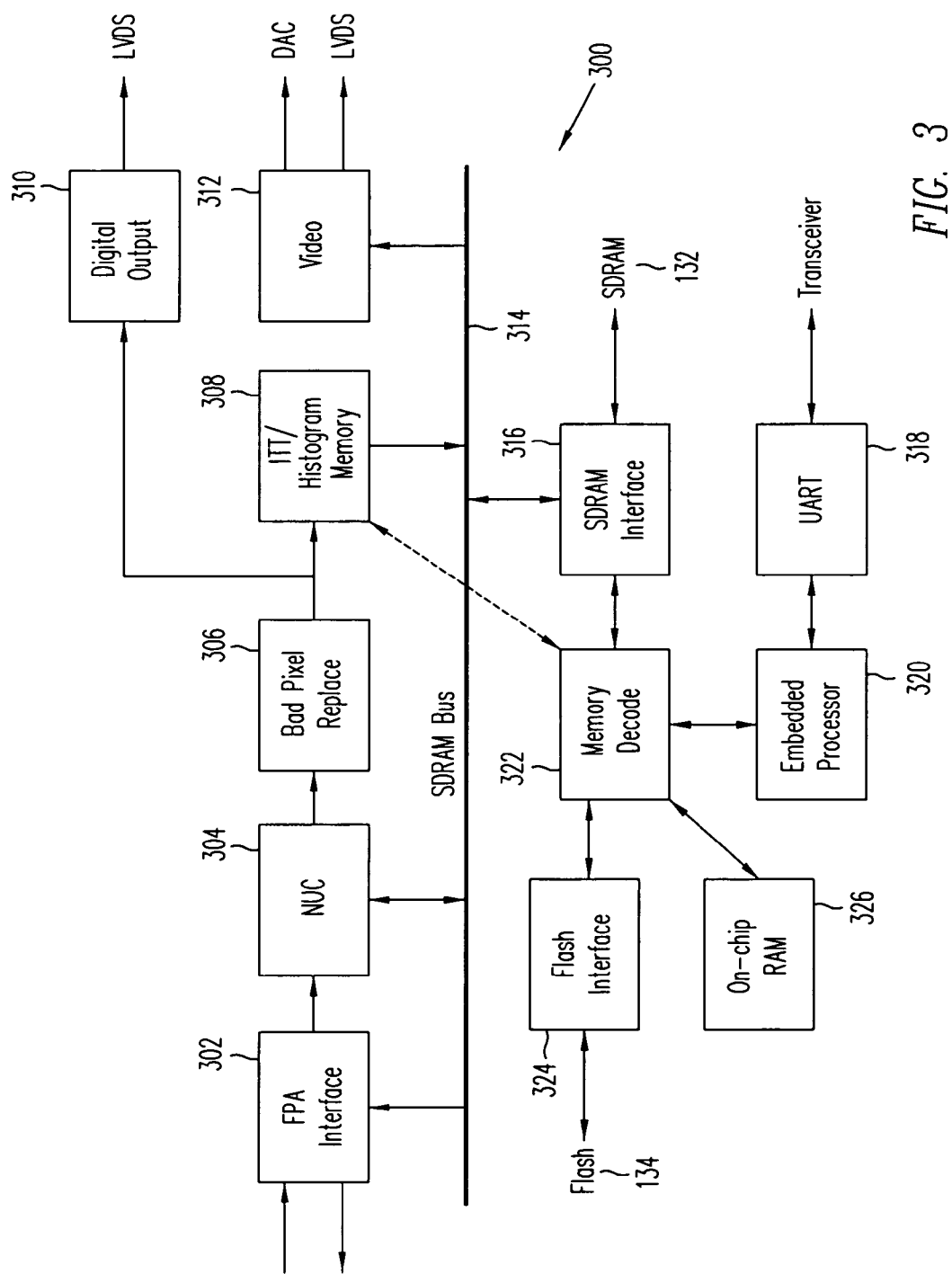
FIG. 3 shows an exemplary functional block diagram for a portion of the circuit block diagram of FIG. 2 in accordance with an embodiment of the present invention.

Referring now to FIGS. 1-3, FIG. 2 shows a circuit 200, which is an exemplary circuit block diagram for video board 102 for infrared camera architecture 100 of FIG. 1 in accordance with an embodiment of the present invention. As illustrated in FIG. 2, circuit 200 includes a programmable logic device (PLD) 202, while FIG. 3 shows an exemplary functional block diagram 300 for PLD 202 of FIG. 2 in accordance with an embodiment of the present invention.

PLD 202 (e.g., a field programmable gate array (FPGA)) performs many of the functions discussed in reference to video board 102 (FIG. 1). For example, PLD 202 provides functionality discussed in reference to conversion circuit 116, timing and control block 118, processor block 120, correction function block 122, bad pixel replacement block 124, intensity transform table (ITT) block 126, and associated histogram and compression function block 130.

PLD 202 interfaces with power block 104 via a connector 216 (e.g., a board-to-board connector) and interfaces with detector package 106 via a connector 210 (e.g., a bolo connector for connecting to the FPA). Under control of PLD 202, various reference voltages and bias voltages and/or currents may also be provided to detector package 106 by a reference circuit 212 (e.g., along with a reference generator 214) via connector 210. Thus for example, PLD 202 may provide command data and correction data (e.g., on-chip DAC terms) to the FPA, perform biasing control for the FPA, and receive infrared data from the FPA. As a specific example, PLD 202 may provide calibration and temperature compensation for the FPA as well as NUC of the infrared data from the FPA as disclosed in U.S. Pat. No. 6,812,465 issued Nov. 2, 2004 and entitled "Microbolometer Focal Plane Array Methods and Circuitry," which is incorporated herein by reference in its entirety.

JTAG commands may optionally be provided to PLD 202 via a JTAG connector 226, for example. As illustrated in FIG. 2, the flag driver functionality for motor 108 may be implemented within circuit 200 (e.g., a flag driver 222 via a connector 220 to motor 108) or within power block 104 (as discussed in reference to FIG. 1).

A clock circuit 224 (e.g., an oscillator) may be provided within circuit 200 to provide one or more timing or clock signals (e.g., for PLD 202). A video digital-to-analog converter (VDAC) 218 may also be provided external to PLD 202 within circuit 200 to provide video conversion (e.g., as described for video DAC block 128 of FIG. 1). Consequently, video data may be provided by PLD 202 as digital output data (e.g., serial digital video) or by VDAC 218 as video data out (e.g., composite video such as provided by video data out 140).

Non-volatile memory may be provided external to PLD 202 to store configuration data for configuring PLD 202 via a bitstream. For example, a boot PLD 208 may be employed to control the loading of the configuration data into PLD 202 from flash memory 134. Alternatively for example, PLD 202 may be implemented with embedded non-volatile memory (e.g., flash memory) to store the configuration data that is transferred internally into the configuration memory of PLD 202 upon power up. Thus, the external bitstream and boot PLD 208 would not be required to configure PLD 202. Furthermore for example, SDRAM 132 may be embedded within PLD 202 (e.g., as embedded block RAM) along with flash memory 134, depending upon the desired application and memory requirements.

For this exemplary implementation, circuit 200 includes flash memory 134 and SDRAM 132, which interface with PLD 202 to store desired information. For example as illustrated in FIG. 3, which shows exemplary functional block diagram 300 for PLD 202 of FIG. 2 in accordance with an embodiment of the present invention, PLD 202 provides a flash interface 324 and an SDRAM interface 316 to communicate with flash memory 134 and SDRAM 132, respectively. PLD 202 may also utilize embedded memory 326 (e.g., labeled on-chip RAM), such as embedded block RAM, distributed RAM (e.g., LUT-based RAM), or other types of volatile or non-volatile memory that may be embedded within PLD 202.

A memory controller 322 (e.g., memory decode and control) may be implemented within PLD 202 to control and manage the data flow to and from flash memory 134, SDRAM 132, PLD 202, and any other integrated circuits (e.g., discrete electrical devices) within infrared camera architecture 100. For example, memory controller 322 may include a DRAM controller to control the data flow for SDRAM 132 and the data flow on a memory data bus 314 (e.g., an SDRAM bus).

For an exemplary implementation, memory controller 322 may control the interface (e.g., flash interface 324) between flash memory 134 and PLD 202 and control memory data bus 314 for SDRAM 132 and the data flow on memory data bus 314 between flash memory 134 and SDRAM 132 (i.e., manages the data flow between flash memory 134, SDRAM 132, and PLD 202). The architecture of memory controller 322, for example, may be based on a cache-based distributed controller architecture, which uses FIFOs to receive data when memory is available. The internal memory of PLD 202 is generally sufficient to allow the cache-based architecture. Furthermore for example, by using data bursts (e.g., 8-word bursts), utilization of SDRAM 132 may be reduced.

A processor 320 (e.g., a RISC embedded processor) is implemented within PLD 202 to perform the required processing within infrared camera architecture 100. For example, processor 320 may be employed to control an infrared detector interface 302 (e.g., an FPA interface) between PLD 202 and detector package 106, such as to provide switching and control functionality as discussed in reference to conversion circuit 116 and timing and control block 118. Processor 320 may interface with memory controller 322 (e.g., to have access to flash memory 134 and SDRAM 132) and a UART 318 to handle the data flow and interface, for example, with other serial devices (e.g., UART 318 may function as a LIN transceiver). As an example in accordance with an embodiment of the present invention, processor 320 may have exclusive access to flash memory 134 and arbitrated access to SDRAM 132.

In general, PLD 202 is employed to provide a NUC processing 304, a bad pixel replacement function 306, an ITT and associated histogram function 308, and a data output (e.g., a digital output 310 and a video output 312), as discussed for example in reference to correction function block 122, bad pixel replacement block 124, ITT block 126 and associated histogram and compression function block 130, and VDAC block 128 (or VDAC 218) along with video data out 140 and/or digital output 142.

Systems and methods are disclosed herein to provide infrared camera architectures and techniques for implementing an infrared camera system. For example, in accordance with an embodiment of the present invention, an infrared camera architecture may be viewed as having main functional blocks represented by a PLD, a flash memory, and an SDRAM. The PLD controls a detector package (e.g., biasing, settings, and communication with FPA), performs NUC calibration on the data from the detector package, performs temperature compensation calculations (e.g., Lagrange curve-fitting operations) and applies the terms to the data, performs automatic gain control (AGC, e.g., histogram based), and transforms the data based on the ITT information. The PLD also performs any required graphics processing, video encoding, and controls the data output from the infrared camera architecture. For example in accordance with one exemplary implementation, the PLD may represent the only digital device within the infrared camera architecture for managing the operation of the infrared camera, with the PLD controlling the external memory, VDAC, and circuitry of the FPA (e.g., ROIC). Alternatively, it should be understood that the external memory may be embedded within the PLD as well as the VDAC to consolidate the video board functionality within the PLD, depending upon the desired application and requirements.

The flash memory may be used, for example, to store the configuration data for the PLD. Consequently, the infrared camera architecture may be upgraded (e.g., in system or field upgrade) with additional or improved functions, algorithms, and/or capabilities, for example, by simply providing new configuration data to the flash memory for the PLD, as would be understood by one skilled in the art. The flash memory may also be utilized to store calibration data that may be applied to the detector package to calibrate the FPA and/or to the infrared data from the detector package.

The flash memory may further be used to store processor routines (e.g., processor software, instruction sets, or functional algorithms) for execution by processor 320. Additional processor routines, for example, may be stored within PLD 202 (e.g., within on-chip RAM and provided as configuration data) for supporting the booting/initializing of processor 320 (e.g., boot ROM or BIOS-type routines) and/or supporting in-field reprogramming of the flash memory.

The SDRAM may be used, for example, as temporary storage for passing through correction terms (e.g., calibration data or NUC data) and/or as a temporary video buffer (e.g., run-time video buffer). For example, the SDRAM may be used as a mass storage for pixel correction terms (e.g., run-time storage of NUC terms) for the FPA of the detector package.

Embodiments described above illustrate but do not limit the invention. It should also be understood that numerous modifications and variations are possible in accordance with the principles of the present invention. Accordingly, the scope of the invention is defined only by the following claims.

What is claimed is:

1. An infrared camera comprising:
an infrared detector adapted to provide infrared data;
a programmable logic device, coupled to the infrared detector, adapted to provide timing and control signals to the infrared detector and process the infrared data to provide an output signal based on the infrared data;
a first volatile memory adapted to function as a video buffer and provide a temporary storage for the programmable logic device; and
a first non-volatile memory adapted to store configuration data for the programmable logic device, wherein the programmable logic device is further adapted to provide a memory controller function comprising a cache-based distributed controller function for the infrared camera to provide a cache-based system using first-in-first-out memory configured within the programmable logic device to manage data flow between the first volatile memory, the first non-volatile memory, and the programmable logic device.

2. The infrared camera of claim 1, wherein the first non-volatile memory and the first volatile memory are embedded within the programmable logic device.

3. The infrared camera of claim 1, wherein the programmable logic device is further adapted to provide an embedded processor to process the infrared data.

4. The infrared camera of claim 3, wherein the first non-volatile memory is further adapted to store processor routines executed by the embedded processor.

5. The infrared camera of claim 1, wherein the processing of the infrared data by the programmable logic device comprises performing non-uniformity correction on the infrared data and replacing bad pixel data within the infrared data.

6. The infrared camera of claim 5, wherein the processing of the infrared data by the programmable logic device further comprises performing automatic gain control and transforming the infrared data to provide composite video as the output signal.

7. The infrared camera of claim 1, wherein the output signal comprises a composite video signal, and the programmable logic device further provides a digital output signal based on the infrared data.

8. The infrared camera of claim 1, further comprising a video digital-to-analog converter adapted to convert the output signal to a composite video signal.

9. The infrared camera of claim 1, wherein the infrared camera is incorporated into a vehicle.

10. An infrared camera comprising:
   means responsive to infrared energy for providing infrared data;
   a programmable logic device adapted to control the providing means and process the infrared data to provide an output signal based on the infrared data, wherein the programmable logic device is further adapted to provide an embedded processor for processing the infrared data;
   a first means for storing configuration data for the programmable logic device and calibration data for the providing means; and a second means for storing the infrared data, wherein the programmable logic device manages the transfer of data between the first storing means, the second storing means, and the programmable logic device by providing a cache-based distributed memory controller which utilizes first-in-first-out memory configured within the programmable logic device.

11. The infrared camera of claim 10, further comprising means for converting the output signal from a digital to an analog signal.

12. The infrared camera of claim 10, wherein the processing of the infrared data by the programmable logic device comprises performing non-uniformity correction on the infrared data, replacing bad pixel data within the infrared data, and transforming the infrared data from X-bit to Y-bit infrared data, wherein Y is less than X.

13. The infrared camera of claim 10, wherein the programmable logic device is further adapted to provide temperature compensation data to the providing means to calibrate the providing means, and wherein the first storing means stores processor routines executed by the embedded processor.

14. The infrared camera of claim 10, wherein the output signal comprises a composite video signal, and the programmable logic device further provides a digital output signal based on the infrared data.

15. The infrared camera of claim 10, wherein the infrared camera forms a subsystem within a vehicle.

16. A method of providing infrared images, the method comprising:
   converting received infrared energy to infrared data;
   controlling the converting operation by a programmable logic device;
   processing the infrared data by the programmable logic device;
   storing in a non-volatile memory configuration data and processor routines for the programmable logic device and calibration data for the converting operation; and
   providing volatile memory for temporary storage and video buffering, wherein the programmable logic device provides memory controller functionality to manage the transfer of information between the volatile memory, the non-volatile memory, and the programmable logic device,
   wherein the memory controller functionality is a cache-based distributed controller function which utilizes first-in-first-out memory configured within the programmable logic device.

17. The method of claim 16, wherein the controlling operation further comprises the programmable logic device providing temperature compensation information stored in the non-volatile memory for the converting operation.

18. The method of claim 16, wherein the processing operation further comprises performing non-uniformity correction on the infrared data, replacing bad pixel data within the infrared data, and transforming the infrared data from X-bit to Y-bit infrared data, wherein Y is less than X.

* * * * *